(12) United States Patent
Case et al.

(10) Patent No.: US 9,335,761 B2
(45) Date of Patent: May 10, 2016

(54) PROCEDURE CLASSIFICATION FOR INDUSTRIAL AUTOMATION

(75) Inventors: Clark L. Case, Aurora, OH (US); Robert Kline, Phoenix, AR (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 580 days.

(21) Appl. No.: 12/241,205

(22) Filed: Sep. 30, 2008

(65) Prior Publication Data
US 2010/0082119 A1 Apr. 1, 2010

(51) Int. Cl.
*G06F 19/00* (2011.01)
*G05B 19/418* (2006.01)
*A47J 31/053* (2006.01)

(52) U.S. Cl.
CPC .. *G05B 19/4188* (2013.01); *G05B 2219/31395* (2013.01); *G05B 2219/31413* (2013.01); *Y02P 90/24* (2015.11)

(58) Field of Classification Search
CPC ............... G05B 19/4188; G05B 2219/31413; G05B 2219/31395; Y02P 90/24
USPC ............... 700/9, 30, 223, 231, 239, 241, 105, 700/109, 115, 159, 174; 99/309
See application file for complete search history.

(56) References Cited

U.S. PATENT DOCUMENTS

| | | | | |
|---|---|---|---|---|
| 4,116,771 A | * | 9/1978 | Amotz et al. | 435/177 |
| 4,877,940 A | * | 10/1989 | Bangs et al. | 219/124.34 |
| 4,972,365 A | * | 11/1990 | Dodds et al. | 710/5 |
| 5,010,472 A | * | 4/1991 | Yoneda et al. | 700/49 |
| 5,014,208 A | * | 5/1991 | Wolfson | 700/99 |
| 5,088,045 A | * | 2/1992 | Shimanaka et al. | 700/110 |
| 5,315,521 A | * | 5/1994 | Hanson et al. | 700/103 |
| 5,323,308 A | * | 6/1994 | Yoshikura et al. | 700/20 |
| 5,329,444 A | * | 7/1994 | Takahashi et al. | 705/7.26 |
| 5,383,117 A | * | 1/1995 | Takai | 700/12 |
| 5,832,195 A | * | 11/1998 | Braun et al. | 714/2 |
| 5,943,408 A | * | 8/1999 | Chen et al. | 379/216.01 |
| 5,950,006 A | * | 9/1999 | Crater et al. | 717/140 |
| 5,966,301 A | * | 10/1999 | Cook et al. | 700/3 |
| 6,126,080 A | * | 10/2000 | Wada | 236/51 |
| 6,134,304 A | * | 10/2000 | Norell | 379/100.05 |
| 6,248,244 B1 | * | 6/2001 | Dann | 210/764 |
| 6,308,182 B1 | * | 10/2001 | Nishigaya et al. | |
| 6,477,435 B1 | * | 11/2002 | Ryan et al. | 700/86 |

(Continued)

FOREIGN PATENT DOCUMENTS

EP 0138135 A2 * 1/1984

OTHER PUBLICATIONS

Barker et al. "Practical Software Project Planning and Implementation", 2005, Mathematics and Computer Simulation, p. 541-558.*

(Continued)

*Primary Examiner* — Carlos Ortiz Rodriguez
*Assistant Examiner* — Thomas Stevens
(74) *Attorney, Agent, or Firm* — Amin, Turocy & Watson, LLP

(57) ABSTRACT

A processing component that executes one or more industrial control procedures is provided. A procedure class component implements at least one instance of the industrial control procedures, where the instance is dynamically adapted to a parameter of equipment that operates the industrial control procedure.

20 Claims, 11 Drawing Sheets

(56) References Cited

U.S. PATENT DOCUMENTS

| | | | |
|---|---|---|---|
| 6,556,950 B1* | 4/2003 | Schwenke et al. | 702/183 |
| 6,630,747 B1* | 10/2003 | Kamada et al. | 307/10.1 |
| 6,725,281 B1* | 4/2004 | Zintel et al. | 719/318 |
| 6,819,960 B1* | 11/2004 | McKelvey et al. | 700/17 |
| 6,854,111 B1* | 2/2005 | Havner et al. | 717/163 |
| 6,891,920 B1* | 5/2005 | Minyard et al. | 378/37 |
| 6,947,798 B2* | 9/2005 | Bronikowski et al. | 700/90 |
| 6,983,288 B1* | 1/2006 | Kirkwood et al. | |
| 6,993,448 B2* | 1/2006 | Tracy et al. | 702/119 |
| 7,020,876 B1* | 3/2006 | Deitz et al. | 718/100 |
| 7,107,112 B2* | 9/2006 | Brown | 700/100 |
| 7,149,595 B2* | 12/2006 | D'Mura | 700/96 |
| 7,151,966 B1* | 12/2006 | Baier et al. | 700/19 |
| 7,158,840 B2* | 1/2007 | Jacques | 700/28 |
| 7,242,995 B1* | 7/2007 | Morgenson et al. | 700/103 |
| 7,251,611 B2* | 7/2007 | Abbott et al. | 705/7.12 |
| 7,277,865 B1* | 10/2007 | Silverstone et al. | 705/26.4 |
| 7,356,383 B2* | 4/2008 | Pechtl et al. | 700/288 |
| 7,392,104 B1* | 6/2008 | Kappelhoff et al. | 700/95 |
| 7,620,724 B2* | 11/2009 | Weisman et al. | 709/227 |
| 7,676,292 B2* | 3/2010 | Weatherhead et al. | 700/97 |
| 7,725,200 B2* | 5/2010 | Reed et al. | 700/30 |
| 7,844,349 B2* | 11/2010 | Weatherhead et al. | 700/19 |
| 7,856,279 B2* | 12/2010 | Hood et al. | 700/19 |
| 8,150,959 B1* | 4/2012 | Bezdicek et al. | 709/224 |
| 2001/0027385 A1* | 10/2001 | Brown | 703/9 |
| 2002/0032718 A1* | 3/2002 | Yates et al. | 709/107 |
| 2002/0062475 A1* | 5/2002 | Iborra et al. | 717/108 |
| 2002/0095221 A1* | 7/2002 | Cook et al. | 700/4 |
| 2002/0156548 A1* | 10/2002 | Arackaparambil et al. | 700/108 |
| 2003/0009253 A1* | 1/2003 | McIntyre et al. | 700/108 |
| 2003/0028269 A1* | 2/2003 | Spriggs et al. | 700/83 |
| 2003/0131075 A1* | 7/2003 | Bear et al. | 709/219 |
| 2003/0172002 A1* | 9/2003 | Spira et al. | 705/27 |
| 2003/0220709 A1* | 11/2003 | Hartman et al. | 700/121 |
| 2004/0040316 A1* | 3/2004 | Bradley et al. | 62/46.1 |
| 2004/0181294 A1* | 9/2004 | Deitz et al. | 700/19 |
| 2004/0204772 A1* | 10/2004 | Maturana et al. | 700/2 |
| 2004/0267395 A1* | 12/2004 | Discenzo | G05B 13/024 700/99 |
| 2005/0132408 A1* | 6/2005 | Dahley | H04N 7/142 725/80 |
| 2005/0141566 A1* | 6/2005 | Krzyzanowski | 370/503 |
| 2005/0143851 A1* | 6/2005 | Scalfani et al. | 700/108 |
| 2005/0228523 A1* | 10/2005 | Heminway et al. | 700/100 |
| 2006/0074499 A1* | 4/2006 | Hamidpour | 700/19 |
| 2006/0074505 A1* | 4/2006 | Kline | 700/96 |
| 2006/0100728 A1* | 5/2006 | Brown | 700/97 |
| 2006/0123124 A1* | 6/2006 | Weisman et al. | 709/227 |
| 2006/0123125 A1* | 6/2006 | Weisman et al. | 709/227 |
| 2006/0178757 A1* | 8/2006 | Grgic et al. | 700/9 |
| 2006/0184661 A1* | 8/2006 | Weisman et al. | 709/224 |
| 2006/0288301 A1* | 12/2006 | Hood et al. | 715/762 |
| 2007/0050070 A1* | 3/2007 | Strain et al. | 700/99 |
| 2007/0179645 A1* | 8/2007 | Nixon et al. | 700/83 |
| 2007/0233288 A1* | 10/2007 | Hamidpour | 700/84 |
| 2007/0283030 A1* | 12/2007 | Deininger et al. | 709/230 |
| 2008/0066019 A1* | 3/2008 | Worek et al. | 715/965 |
| 2008/0082185 A1* | 4/2008 | Hood et al. | 700/83 |
| 2008/0097624 A1* | 4/2008 | Weatherhead et al. | 700/9 |
| 2008/0097626 A1* | 4/2008 | Reed | G05B 19/4184 700/30 |
| 2008/0097629 A1* | 4/2008 | Weatherhead | G05B 17/02 700/67 |
| 2008/0097630 A1* | 4/2008 | Weatherhead | G05B 19/0426 700/86 |
| 2008/0098351 A1* | 4/2008 | Weatherhead et al. | 717/107 |
| 2008/0127186 A1* | 5/2008 | Kanodia et al. | 718/101 |
| 2008/0133039 A1* | 6/2008 | Brown | 700/97 |
| 2008/0147207 A1* | 6/2008 | D'Mura et al. | 700/20 |
| 2008/0288089 A1* | 11/2008 | Pettus et al. | 700/9 |
| 2009/0082894 A1* | 3/2009 | Pettus et al. | 700/105 |
| 2009/0089234 A1* | 4/2009 | Sturrock et al. | 706/45 |
| 2009/0138415 A1* | 5/2009 | Lancaster | 706/11 |
| 2009/0327992 A1* | 12/2009 | Weatherhead | 717/102 |
| 2010/0082132 A1* | 4/2010 | Marruchella et al. | 700/86 |

OTHER PUBLICATIONS

Sandison-J., "Automation at South African Breweries", 2002, EE Publishers, South African, pp. 43-44.*

American National Standard ANSI/ISA-88.01-1995. 1995, 98 pages.*

* cited by examiner

PROCEDURE CLASSIFICATION FOR INDUSTRIAL AUTOMATION

TECHNICAL FIELD

The claimed subject matter relates generally to industrial control systems and more particularly to procedure class structures that adapt performance to detected equipment capabilities.

BACKGROUND

Industrial controllers are often employed in integrated manufacturing operations that can often involve high-complexity manufacturing processes. Such processes which are sometimes referred to as batch processes are involved in many areas of modern production. These areas include substantially any type of packaged products that are commonly found in grocery stores or other distribution outlets. For example, these products include beverages, candies, sugar, flour, pastries, cereals, frozen products, cheeses, and so forth. Often, complex factory equipment arrangements and programming are provided to produce all or portions of such products. Programming is often provided in terms of Sequential Function Blocks and Charts that relate logical programmed production operations to equipment assets that control the operations. Generally, batch processes operate on high-performance server systems that send commands to controllers and other devices to produce a product. Discrete processing involves the manufacture of larger components from discrete hardware and often involves an automated assembly line. Modern automobile manufacture is a good example of a discrete process. Batch processing typically involves the mixture of materials such as in an automated recipe.

One challenge facing automated processing systems is the requirement to produce various different types of products within the confines of a single manufacturing center or facility. For example, often times hundreds of different types of recipes are maintained for some product families that only vary slightly in terms of the actual ingredients in the recipe. Thus, for a product such as cherry vanilla ice cream and a product such as strawberry vanilla ice cream, two different recipes would be required to be maintained—although the only difference in recipe content is the type of fruit employed in the final production process. As can be appreciated, as product families grow in terms of quantity and diversity, maintenance of such recipes, respective programs, and equipment to produce such products becomes ever more complicated in terms of product/factory management but also in terms of maintaining quality within and across product lines.

Another type of challenge facing these processing systems is the notion that various equipment can serve multiple roles and have differing degrees of availability to a given automated process. For example, one container that is normally used as a mixing vessel may be unavailable due to maintenance down time. In another example, the same container may be employed in a different process and currently unavailable to a current real time process at hand. Not only does equipment have differing degrees of availability and usage, such equipment may also have differing degrees of functionality. For instance, one vessel may be associated with two material feed lines whereas another vessel may have a single feed. If a batch processing component were to account for all these type of nuances involving availability and functionality, a significant programming and performance overhead can be encountered for a respective processing machine. This leads to added cost for software development and less efficient performance during operation of the process.

SUMMARY OF THE INVENTION

The following summary presents a simplified overview to provide a basic understanding of certain aspects described herein. This summary is not an extensive overview nor is it intended to identify critical elements or delineate the scope of the aspects described herein. The sole purpose of this summary is to present some features in a simplified form as a prelude to a more detailed description presented later.

Procedure class structures are provided as an abstraction of a procedure to be performed including where/how the procedure is actually performed. Thus, the procedure may be implemented in different forms since the equipment that may be available to a given process often has different capabilities. In one aspect, an adaptive procedure can be provided where the procedure automatically modifies its operating characteristics and capabilities (e.g., performance, memory employed) based on the type of hardware detected for executing the procedure. In one example of a mixing process, three materials may need to be added to a recipe but the actual operating instance of the respective procedure may be different based on equipment detected. Thus, a mixer that has 6 feeds can add all the material additions in parallel. If another mixer detected only has one feed, then the procedure can only add the materials in a serial manner. The example of adding materials is the class structure whereas instances of the class specify capabilities of the equipment. Instances when procedures can be executed can be on any platform e.g., controller, batch server, and so forth. User interface options can also be provided to enable manual selection of classes and instances. Other structures such as material classes can also influence how procedures are selected and executed.

To the accomplishment of the foregoing and related ends, the following description and annexed drawings set forth in detail certain illustrative aspects. These aspects are indicative of but a few of the various ways in which the principles described herein may be employed. Other advantages and novel features may become apparent from the following detailed description when considered in conjunction with the drawings.

DETAILED DESCRIPTION OF THE INVENTION

An industrial control system is provided that automatically adapts instances of a procedure class to detected capabilities of equipment at hand. In one aspect, a processing component executes one or more industrial control procedures. A procedure class component implements at least one instance of the industrial control procedures, where the instance is dynamically adapted to a parameter of equipment that operates the industrial control procedure. The parameter can be associated with equipment availability or equipment capability, for example.

It is noted that as used in this application, terms such as "component," "module," "procedure," and the like are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process or thread of execution and a component may be localized on one computer or distributed between two or more computers, industrial controllers, or modules communicating therewith.

Figure 1:
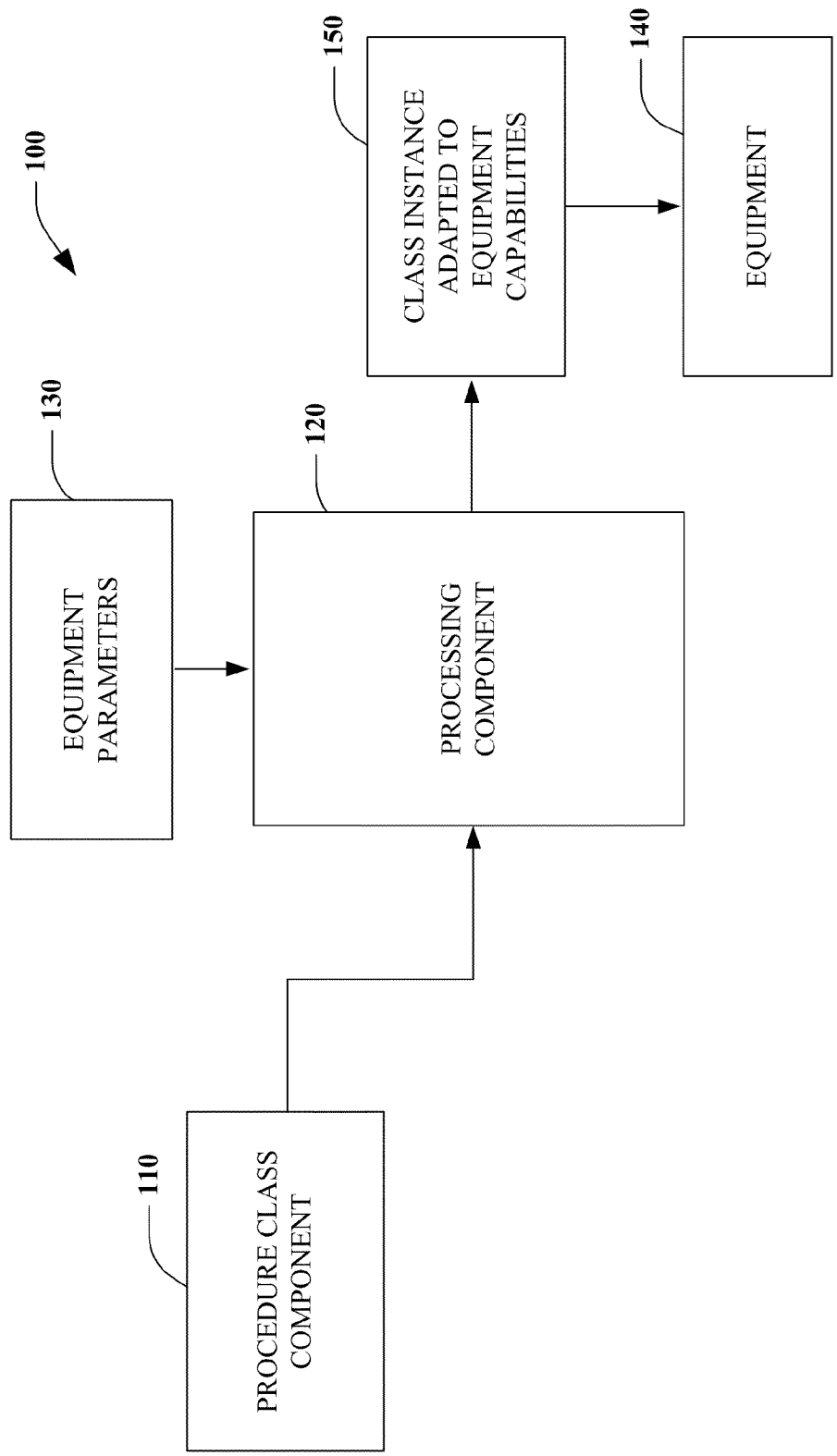
FIG. 1 is a schematic block diagram illustrating procedure class components that dynamically adapt controller processing routines to detected equipment capabilities.

Referring initially to FIG. 1, a system 100 illustrates procedure class components that dynamically adapt controller processing routines to detected equipment capabilities. A procedure class component 110 is operated on by a processing component 120. The processing component 120 is typically a server or computer system such as a batch server for industrial control systems. The procedure class component 110 (or components) specifies components of a recipe that are subsequently executed by the processing component 120, where the recipe identifies what aspects of a process are employed to produce a given recipe. In one example, an S88 standard provides models that define equipment control, procedure control, and activity. One aspect to implementing this and other standards is creating the ability to separate recipe development from equipment control through the use of an equipment module (not shown) that includes both actual equipment (e.g., tanks, pumps, etc.) and a software representation of the same hardware that includes all the process capabilities. For a given grouping of equipment, each process task is typically designated as a phase against that equipment module.

A process unit can be broken down into its equipment modules, which represent all the possible tasks for that grouping. Each unit represents an organization of code in the controller designed by the process engineers that will perform the task each time it is called. Each equipment module is also designed to accept one or more parameters. With material addition for example, two parameters specify which material to add and how much. Under the S88 standard, this represents the equipment model. The next step in the S88 standard is the procedural model, where the process engineer maps which equipment modules to call, in what order. This map is called an operation under the standard. For example, the process engineer creates a procedure that supports the ability first to purge the unit, add two materials, mix, react, and then transfer out. This becomes the foundation of a recipe template which can be common to different products, but differentiated by the parameters for each phase. Under this model, the parameters or formulation can be managed independently of operation templates. The process engineers create a family of templates to cover multiple arrangements of equipment usage. The formulators then create parameter sets. At runtime, the proper operation can be matched up with the proper formula set to create an S88 control recipe that can be executed against the equipment. It is to be appreciated procedural models other than S88 can also be employed.

As shown, one or more equipment parameters 130 are monitored by the processing component 120 to determine capabilities of equipment 140. Such capabilities can include aspects like the number or inputs or feeds into a given piece of equipment 140, number of output devices available to operate on a piece of equipment and so forth. The parameters will be described in more detail below with respect to FIG. 2. Upon processing the parameters 130 which can be manually entered via a user interface or automatically detected, the processing component 120 generates a class instance 150 that is automatically or dynamically adapted to capabilities of the equipment 140. For example, if the equipment 140 had several inlet feeds, and a given recipe calls for less materials to be added than the number of feeds, then the material additions could be added in parallel thus saving time over a hard-programmed serial operation as in conventional systems that cannot adapt to detected conditions of the equipment 140. If less feeds were available, then material may have to be dynamically adjusted for serial operations in some instances. In general, the class instances 150 which are executable instances of the procedure class component 110 can adapt to any condition of the equipment 140 as detected by the equipment parameters 130.

In general, procedure class structures or components 110 are provided as an abstraction of a procedure to be performed including where/how the procedure is actually performed. Thus, an instance of the procedure may be dynamically executed in different forms since the equipment 140 that may be available to a given process often has different capabilities. In one aspect, an adaptive procedure can be provided where an instance of the procedure automatically modifies its operating characteristics and capabilities (e.g., performance, memory employed) based on the type of hardware detected for executing the procedure. In one example of a mixing process, three materials may need to be added to a recipe but the actual operating instance of the respective procedure may be different based on equipment detected. Thus, a mixer that has 6 feeds can add all the material additions in parallel. If another mixer detected only has one feed, then the procedure can only add the materials in a serial manner. The example of adding materials is the class structure whereas instances of the class specify capabilities of the equipment. Instances when procedures can be executed can be on any platform e.g., controller, batch server, and so forth. User interface options can also be provided to enable manual selection of classes and instances. Other structures such as material classes which are described in more detail below can also influence how procedures are selected and executed.

It is noted that components associated with the system 100 can include various computer or network components such as servers, clients, controllers, industrial controllers, programmable logic controllers (PLCs), batch controllers or servers, distributed control systems (DCS), communications modules, mobile computers, wireless components, control components and so forth that are capable of interacting across a network. Similarly, the term controller or PLC as used herein can include functionality that can be shared across multiple components, systems, or networks. For example, one or more controllers can communicate and cooperate with various network devices across the network. This can include substantially any type of control, communications module, computer, I/O device, sensors, Human Machine Interface (HMI) that communicate via the network that includes control, automation, or public networks. The controller can also communicate to and control various other devices such as Input/Output modules including Analog, Digital, Programmed/Intelligent I/O modules, other programmable controllers, communications modules, sensors, output devices, and the like.

The network can include public networks such as the Internet, Intranets, and automation networks such as Control and Information Protocol (CIP) networks including DeviceNet and ControlNet. Other networks include Ethernet, DH/DH+, Remote I/O, Fieldbus, Modbus, Profibus, wireless networks, serial protocols, and so forth. In addition, the network devices can include various possibilities (hardware or software components). These include components such as switches with virtual local area network (VLAN) capability, LANs, WANs, proxies, gateways, routers, firewalls, virtual private network (VPN) devices, servers, clients, computers, configuration tools, monitoring tools, or other devices.

Figure 2:
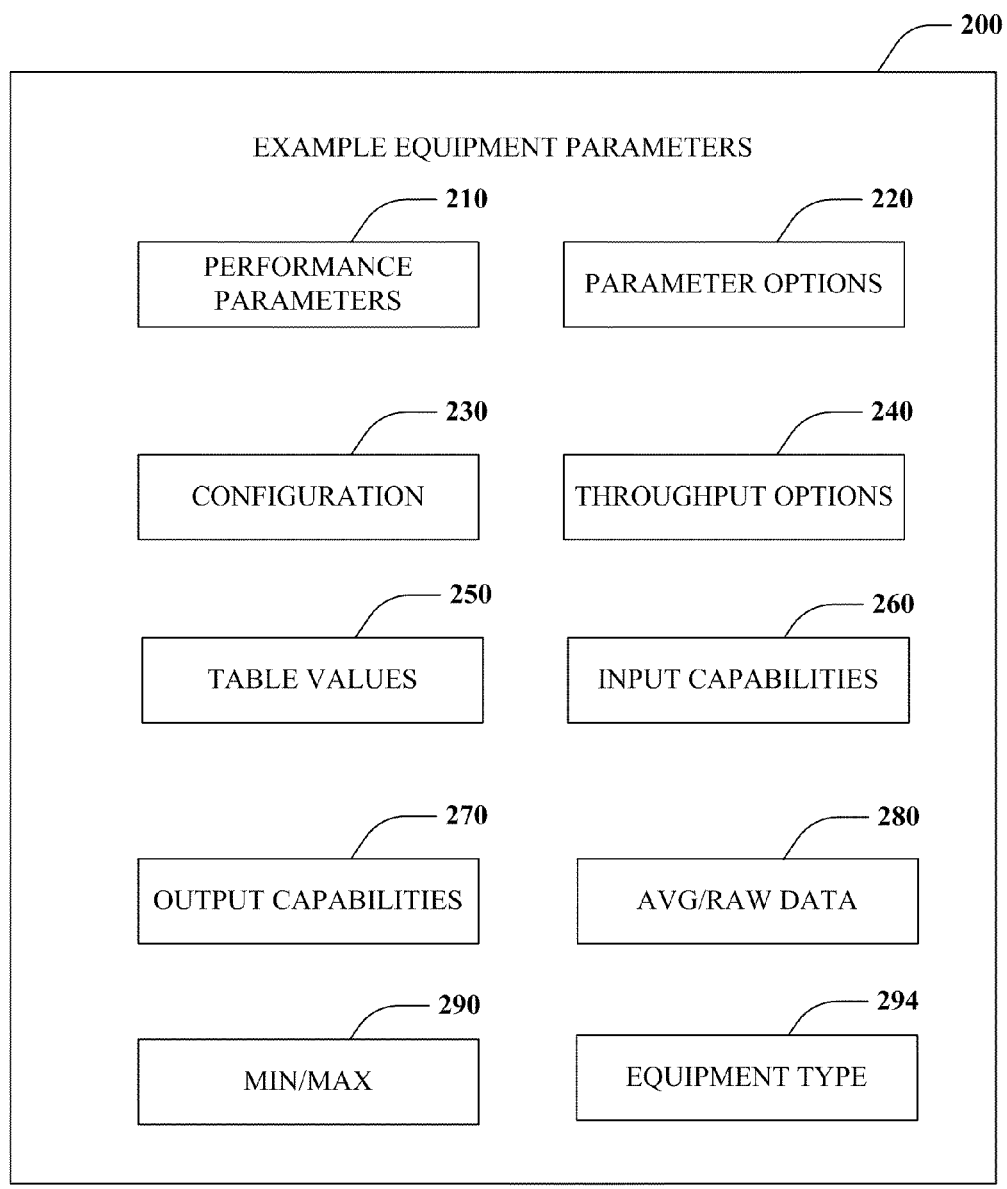
FIG. 2 is a diagram illustrating example equipment parameters for dynamic instances that adapt to equipment capabilities.

Turning now to FIG. 2, example equipment parameters 200 are provided for dynamic instances that adapt to equipment capabilities. In one aspect, performance parameters 210 can be generated and processed. These can be substantially any type of parameter for specifying performance of a component of a recipe or the overall capabilities of equipment. For example, a performance parameter could be to distribute one section of recipe operated by a single controller across multiple controllers. In another example, a device specified for a recipe may be recommended to be replaced by a higher performing device to reduce a system bottleneck and thus improve the performance of the overall system.

Parameter options 220 can be detected. These can be device parameters, instruction parameters, message parameters, network parameters, equipment parameters, controller parameters, and so forth. These type of detections offer alternative parameters that can enhance or alter one or more portions of a recipe. At 230, configuration data relates to substantially any type of data that is applied to configure a component, a control module, a software module, a communications module and so forth. Often times, configuration data 230 can be employed to adjust a component for more optimum performance. One or more throughput options 240 can be generated and basically apply to the system as a whole. For example, these suggestions may be directed at business process models or inventory models that can be adjusted in addition to control system models to improve the overall performance of the system.

Proceeding to 250, one or more table values can be detected and employed to adjust class instances. These can include tag values, controller data table values, analog values, timer values, counter values, and so forth. At 260, one or more input capabilities can be detected. These can include the number of input feeds that can drive a process, the number of holding areas for a process, and substantially any type of input that can be directed into a given process. Output capabilities 270 can include components or modules that can be utilized to control a given process such as the number of pumps or pump capabilities, temperature or heating capabilities for example how quickly a process can be heated, mixer capabilities e.g., mixing speeds, conveyor speeds, controller speeds, network capabilities, and substantially any output control that can be employed operate on a piece of equipment. The values illustrated at 280 and 290 represent differing forms of data. The values at 280 represent parameters in the form of average values (or other type of function) that may be derived from raw data values. At 290, minimum and maximum values are often employed as part of a threshold or range where some equipment data is monitored inside or outside of a given range. In another aspect, an equipment type parameter 294 can be provided. Equipment Type is an indicator or tag that considers some nuance regarding a piece of equipment. For example, "Is the reactor a "Plug Flow" or "Stirred" type?" "Is the liquid/solid separation being performed by a "Cake Filter" or a "Centrifuge"? This would affect the procedure instance that would be used. In addition to type, Equipment Capabilities can be considered—"Does the tank have a sprinkler ball for automatic cleaning, or should it be cleaned manually? This would also affect the procedure instance that would be used.

Figure 3:
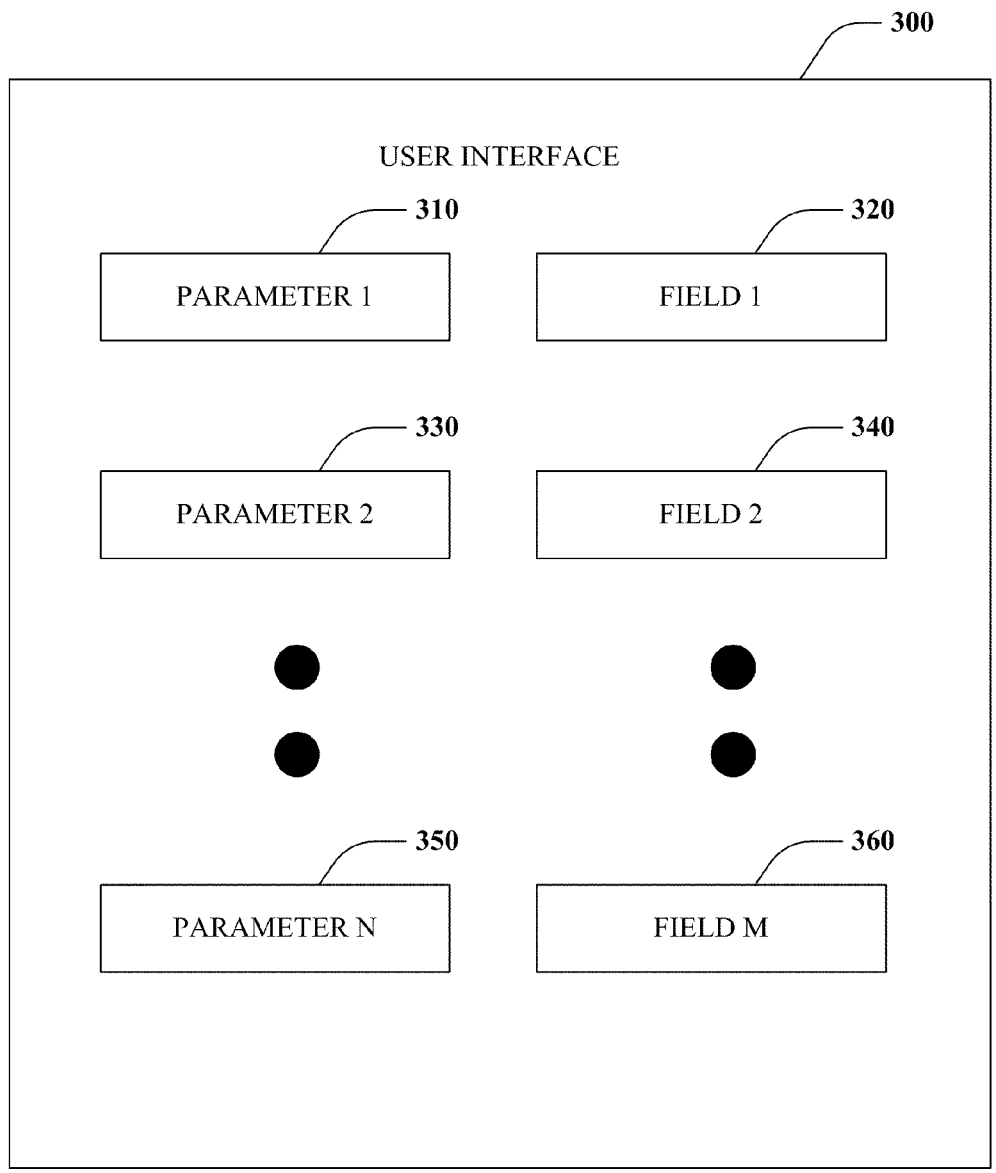
FIG. 3 is a diagram illustrating example suggestion types.

Referring now to FIG. 3, a user interface 300 is provided so a user can communicate data to procedure and processing components described above. In one aspect, the user can specify a multitude of parameters that correspond to user desires or design goals. For example, the user could provide a plurality of goals or operating conditions in the specification that include operating temperature, a desired quantity of product to be produced per time frame, and a desired yield percentage. A parameter box 310 is provided to permit the user to label individual parameters from different portions of a specification or other type input, for example. A field box 320 is provided in the user interface 300 to enable the user to input a particular specification that corresponds to the label in parameter box 310.

Alternatively, the user interface 300 can automatically fill the parameter box labels for the user if existing parameters are commonly used. The user interface 300 can communicate with a database component (not shown) to determine possible parameters, parameter ranges, and parameter limits. Upon retrieval of the parameter data, the user interface 300 can present this information to the user in the form of a parameter box label 310 and a parameter field drop down selection box 320.

For instance, a programmable controller controlling a motor may be expected to have different operating speed settings or revolutions per minute (RPM) settings. The user interface 300 can communicate with a database component (not shown) and determine the variables that could be included as parameters such as input voltage, operating speed (RPMs), and torque. The user interface 300 may determine that the motor could accept three input voltage levels: low, nominal, and high, for example. The user interface 300 may further determine that the motor outputs run at either a low or high level of torque and that it can run between five hundred and one thousand RPMs. Upon determination of the parameter data, the user interface 300 automatically labels parameter box 310 with an "Input Voltage" label and creates a drop down box in field box 320 that lists the three possible settings for the user to choose. Similarly, the user interface 300 can label parameter box 330 as "Torque" and create a drop down box with the two possible settings from which the user could choose. Again, the user interface 300 can automatically label parameter box 350 as "RPM setting". In this situation, however, field box 360 may be left blank and the user interface 300 could prompt the user to input an RPM number between five hundred and one thousand.

It is to be noted that the claimed subject matter is not limited to parameters that are stored within a database. The user may input parameters that do not directly correspond to a particular component. For instance, a user could provide a parameter that recites output of one hundred units per day. The user interface 300 may facilitate the implementation of such a parameter through the determination of suitable process control equipment or processes. Based upon parameter specifications of the user, and those parameter capabilities detected from the equipment, the class instances described above can be automatically adapted by the processing component to adjust the specifications of the user to the capabilities of the equipment. For example, if higher throughput is specified than can be handled by one piece of equipment, it is possible to initialize other equipment to increase capacity or capability of an overall process. In another aspect, an industrial control system for batch processing is provided. The system includes means for defining (user interface 300) one or more procedure classes for a batch process and means for generating class instances (procedure class 110 of FIG. 1) from the procedure classes in view of one or more detected equipment parameters. The system also includes means for controlling equipment (processing component 120 of FIG. 1) in the batch process via the class instances.

Figure 4:
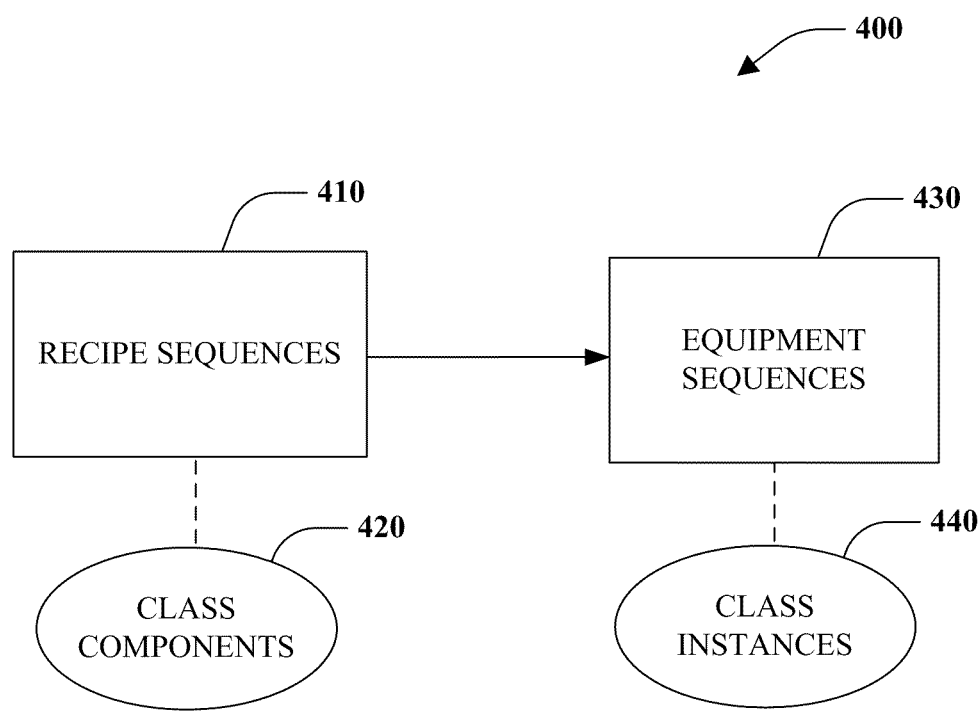
FIG. 4 is a diagram illustrating an alternative class and instance description.

Referring now to FIG. 4, a system 400 illustrates an alternative class and instance description. In one aspect, Recipe Sequences 410 are provided and are similar to a class structure 420 described above. Recipe Sequences is a generic term to refer to Recipe Operations (Operation Classes) or Recipe Unit Procedures (Unit Procedure Classes). One purpose of a Recipe Sequence (Recipe Class) would be to define the parameters (inputs) and reports (outputs) that are required and expected in every "instance" of a Recipe Sequence or Recipe Class. This is similar to the manner in which a Recipe Phase (Phase Class) defines Recipe Parameters and Report Parameters that are used by Equipment Phase (Equipment Modules) assigned to the Recipe Phase (Phase Class).

The concept of a Recipe Sequence (Recipe Class) can be supported at both the S88 Operation and Unit Procedure recipe levels. At the Operation level, this would be referred to as a "Recipe Operation" (Operation class) and at the Unit Procedure level, it would be referred to as a "Recipe Unit Procedure" (Unit Procedure Class). An equipment editor (not shown) would permit construction of Recipe Sequences (Recipe Classes) in much the same manner as it currently supports construction of Recipe Phases (Phase Classes). Instances of Recipe Sequences (Recipe Classes), referred to as Equipment Sequences 430 could then be added to Unit configuration information, being "dropped" into the Unit's configuration similar to the manner in which Equipment Phase (Equipment Module) instances are added. Equipment Sequences are similar in nature top the class instances 440 described above.

Figure 5:
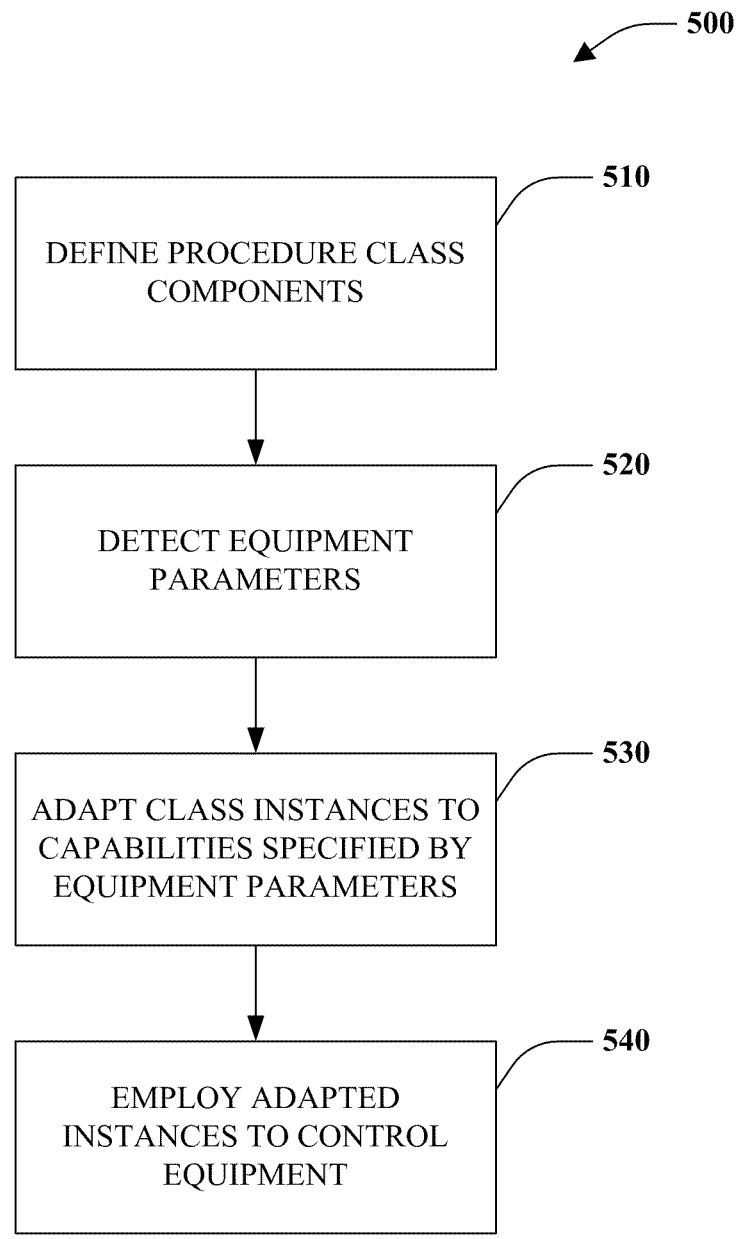
FIG. 5 is a flow diagram illustrating a method for adapting procedure class instances to detected capabilities of equipment.

FIG. 5 is a flow diagram illustrating a method 500 for adapting procedure class instances to detected capabilities of equipment. While, for purposes of simplicity of explanation, the methodology is shown and described as a series of acts, it is to be understood and appreciated that the methodologies are not limited by the order of acts, as some acts may occur in different orders or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology as described herein.

Proceeding to 510, a procedure class is defined. The procedure class component 110 (or components) specifies components of a recipe that are executed or processed, where the recipe identifies what aspects of a process are employed to produce a given recipe. At 520, one or more equipment parameters are monitored or detected to determine capabilities of equipment. As noted previously, such capabilities can include aspects like the number or inputs or feeds into a given piece of equipment, number of output devices available to operate on a piece of equipment, performance parameters, controller variables, and various equipment or other configuration options. Upon processing the parameters at 520 which can be manually entered via a user interface or automatically detected as previously noted, a class instance is automatically or dynamically adapted at 530 to capabilities of the equipment parameters detected at 520. For example, if the equipment had several inlet feeds, and a given recipe calls for less materials to be added than the number of feeds, then the material additions could be added in parallel thus saving time over a hard-programmed serial operation as in conventional systems that cannot adapt to detected conditions of the equipment. If less feeds were available, then material may have to be dynamically adjusted for serial operations in some instances. At 540, the class instances adapted at 530 are executed as instances of the procedure class defined at 510 and can adapt to any condition of the equipment as specified by the equipment parameters.

Figure 6:
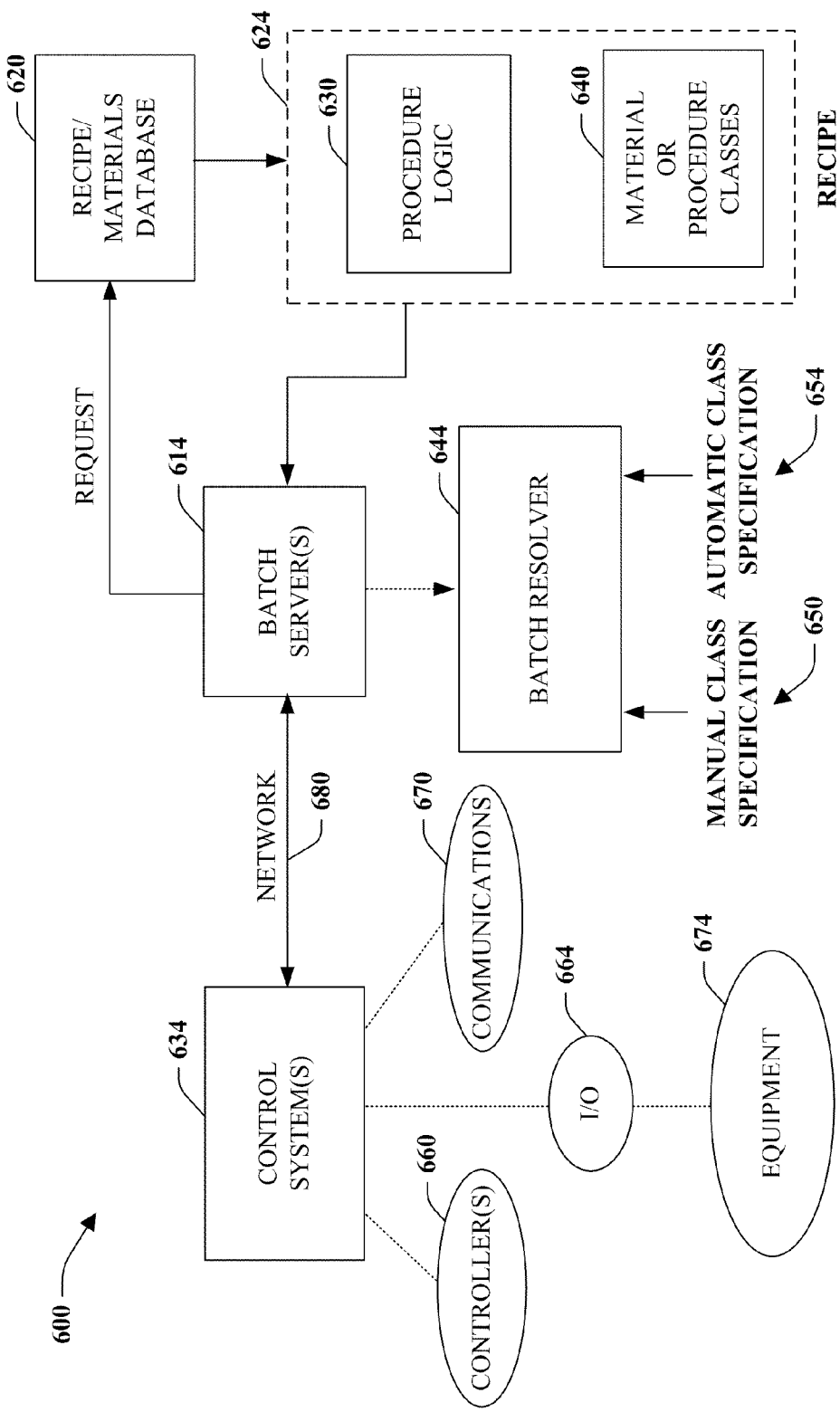
FIG. 6 is a schematic block diagram illustrates a material or procedure class processing system.

Referring to FIG. 6, a material or procedure class processing system 600 is illustrated. One or more batch servers 614 interact with a recipe/materials database 620 in order to retrieve and produce a recipe 624. The recipe 624 typically includes components such as procedure logic 630 that is transmitted to an automated control system 634 (or systems) that processes and manufacturers the recipe 624. In one aspect, one or more material classes 640 are provided that describe materials or other components of the recipe 624. The material classes 640 provide a programming structure, wherein components of the class can be grouped under a common description or tag associated with the class. As can be appreciated, the recipe 624 may include other components than process logic and material classes 640 (e.g., state instructions, tags, objects, scheduling information, quality information, other materials and so forth).

In one example, several carbonated beverages may be produced by the control system 634, whereby the beverages generally conform to the recipe 624, yet differ in flavor or other characteristics. In this example, the material class 640 "flavor" may be defined to include "cola, grape, orange, cherry and so forth." When the batch server 614 retrieves the recipe 624 and encounters a material class 640, a batch resolver 644 is provided to determine which ingredients or materials of the class 640 are to be employed for the present production cycle. In this example, if "grape" beverage were to be produced, then the batch resolver 644 would determine which of the material class components (e.g., grape selected from class flavor) were to be utilized for the respective batch at hand.

In one aspect, material class resolution can occur before and/or during runtime of the control system 634. Thus, the batch resolver 644 may include components such as a user interface (not shown) that are invoked by the batch server 614 (or control system/other component) in order to receive manual specifications of class components or materials at 650. In another aspect, automatic class specifications may occur at 654, whereby the batch resolver 644 is given material instructions from an automated system operating via a network, for example (e.g., batch resolver queries automated scheduling system for material information when a class is encountered in recipe). It is noted that the functional components illustrated in the system 600 are exemplary in nature and not intended to define the only locations for material or procedure class processing. For example, the batch server 614 may include computers or client machines and may not be present in the system 600 whereby the control system 634 performs the duties of the batch server 614. Similarly, the recipe/materials database 620 and batch resolver 644 may be associated with or incorporated within the batch server 614. In another example, the recipe/materials database 620 may exist as a network node on the Internet and thus, interacts with the control system 634 with or without assistance from the batch server 614. As can be appreciated, other functional combinations are possible with the components illustrated in the system 600 (e.g., batch resolver associated with or included in control system).

When material class components have been resolved, the control system 634 processes the recipe 624 in accordance with the procedure logic 630 and materials selected from the material classes 640. The control system 634 can include various systems for processing the recipe 624. Such systems include one or more controllers 660, one or more I/O modules 664 (e.g., analog modules, digital modules, discrete AC and DC modules, Intelligent modules and so forth), communications modules 670 and various equipment 674 to produce the recipe 624. The communications modules 670 facilitate control system communications across a network 680 such as ControlNet, Device,Net, Ethernet, Internet, other factory/public networks and so forth. The equipment 674 includes substantially any component for processing materials such as machines, computers, vessels, mixers, loaders, agitators, valves, conduits, plumbing, and so forth in order to manufacture the recipe and associated materials.

It is noted that the network 680 includes access to public networks such as the Internet, Intranets, and automation networks such as Control and Information Protocol (CIP) networks including DeviceNet and ControlNet (can be adapted as multiple networks wherein factory networks are isolated from public networks). Other networks 680 include Ethernet, TCP/IP, DHWDH+, Remote I/O, Fieldbus, Modbus, Profibus, wireless networks, serial protocols, and so forth. In addition, the control systems 634 can include network components such as switches with virtual local area network (VLAN) capability, LANs, WANs, proxies, gateways, routers, firewalls, virtual private network (VPN) devices, other servers and/or clients, configuration tools, monitoring tools, and/or other devices.

Figure 7:
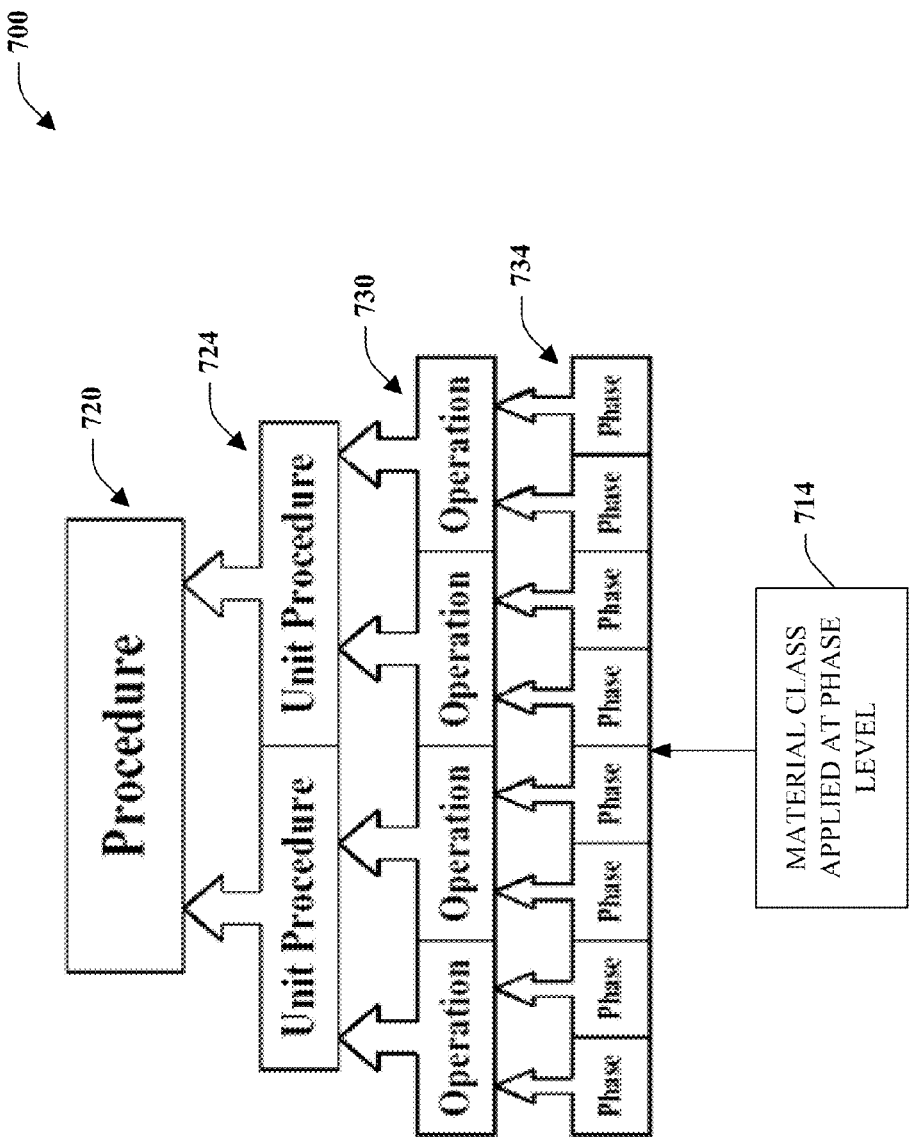
FIG. 7 is a diagram illustrating various stages of a material or procedure class processing system.

Referring now to FIG. 7, a diagram 700 illustrates various stages of a material or procedure class processing system. Various component stages are provided for processing one or more material classes 714. This can include utilization of a Batch Recipe Editor (not shown) to create and configure master recipes for use in batch automation. The interface can based on IEC 61131-3 sequential function charts (SFC) to graphically organize recipes into procedures 720, unit procedures 724, operations 730 and phases 734, wherein the material classes are typically applied or resolved at the phase level 734. It is noted that the material classes 714 can be defined and/or resolved during substantially any portion of an industrial automation process. Furthermore, recipes can be built according to substantially any format such as SFC format, ladder logic, or a table-based format, for example. Recipes can be configured and displayed using ISA S88.01 Batch Control Standards or other standards, which define the following levels for a procedural model:

Procedure 720: A strategy for carrying out a process. In general, it refers to the strategy for making a batch within a process cell. It may refer to a process that does not result in the production of a product. Examples: Make Product A Make Product B.

Unit Procedure 724: A strategy for carrying out a contiguous process within a unit. It consists of contiguous operations and an algorithm for initiation, organization and control of those operations. Examples: Emulsification Dehydrogenation.

Operation 730: A procedural element defining an independent processing activity consisting of an algorithm for initiation, organization and control of phases 734. Examples: Filtration Reaction.

Phase 734: The lowest level of a procedural element in a procedural control model. A phase consists of the control steps and algorithm for initiation, organization and control of steps. Examples: Agitate Heat.

The recipe phase 734 is generally the lowest level within a recipe. The recipe phase is mapped to the engineered logic on a plant floor. When a phase is added to a recipe, it can be based on a phase that has been defined in an area model. Based on the equipment requirements specified in a recipe, a Batch Equipment Editor phase maps to a specific equipment module (an instance of a phase). The equipment module is mapped (using tags) to an equipment operation or equipment phase that has been defined in the engineered logic.

An operation consists of one or more recipe phases, and it generally runs within a single unit in an area model. Users can combine multiple operations into a single unit procedure, as long as respective operations run in a unit in an area model. Unit procedures are then combined to create a procedure, the highest recipe level. Procedures can run or execute across multiple units, allowing for unit-to-unit transfers.

Figure 8:
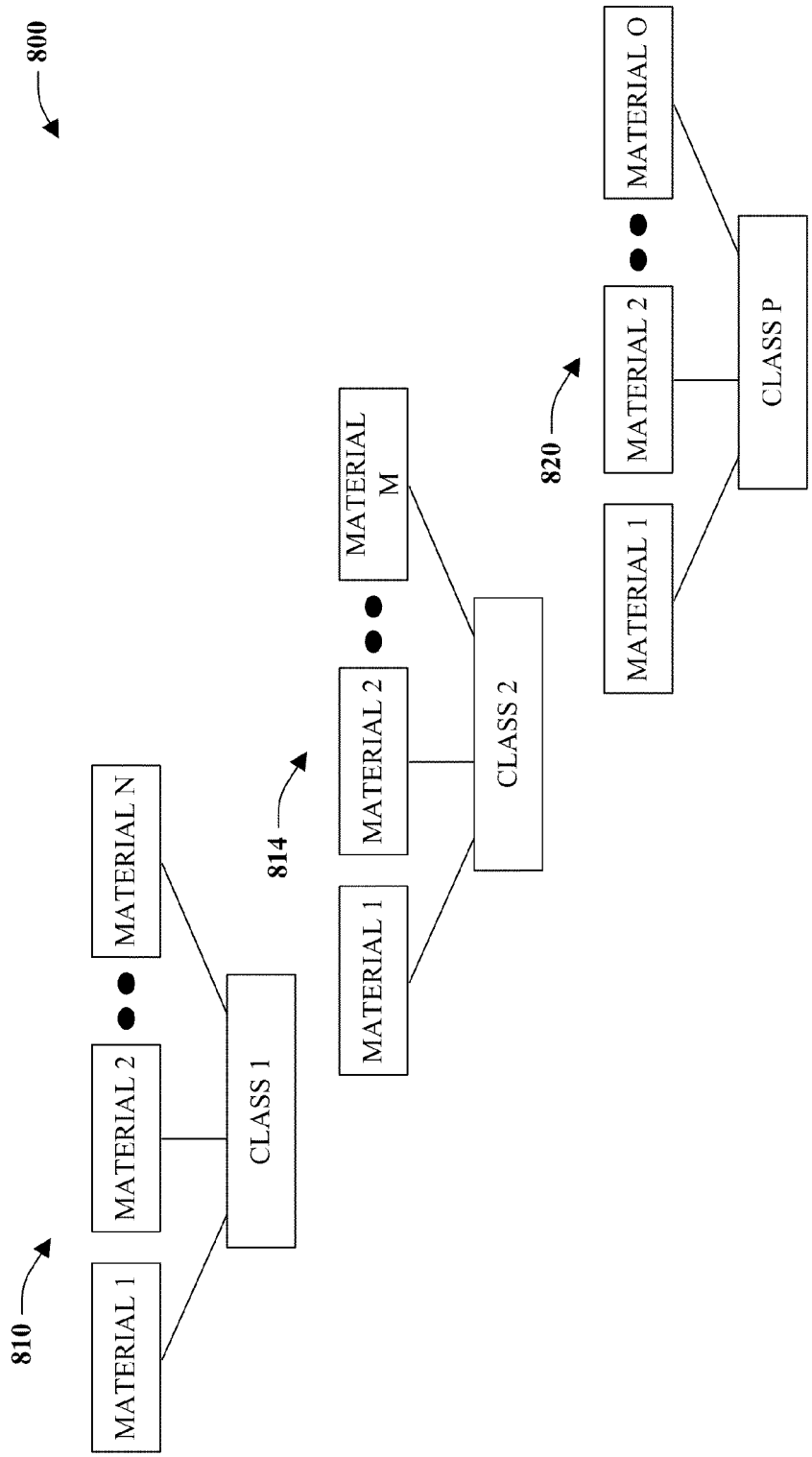
FIG. 8 is a diagram illustrating material class structures.

Turning to FIG. 8, a diagram 800 illustrates material class structures that can be employed with procedure classes and instances. One or more material class structures are illustrated at 810-820 and are designated as Class1 through P, respectively, wherein P is an integer. As illustrated, respective classes 810-820 can be associated with one or more materials that identify components of a recipe. For example, Class1 at 810 may identify or define materials 1 through N, Class2 at 814 defines materials 1 though M, and Class P at 820 defines materials 1 through O, respectively, wherein N, M, and O are integers. As discussed above, the Classes 810-814 may include material definitions or descriptions that fall under the name or tag associated with the class. For example, Class1 at 810 may be labeled or tagged with the name "Juice," wherein respective materials may be defined as orange, grape, grapefruit, and so forth.

It is to be appreciated that the concept of class can be applied to substantially any component or process relating to a recipe and is thus not limited to respective materials. For example, an equipment class could be defined having the name "Vessels," wherein respective class components could be defined as a box, a tube, a cylinder, and so forth. Thus, in this example, when a vessel is called for in a recipe process, the actual vessel to employ can be resolved in a similar manner to material class resolution described above. In another example, process classes may be employed. If a process class were defined as "Transfer," then respective process components linked to the process class may include fill, empty, scrap, exchange, and so forth.

Figure 9:
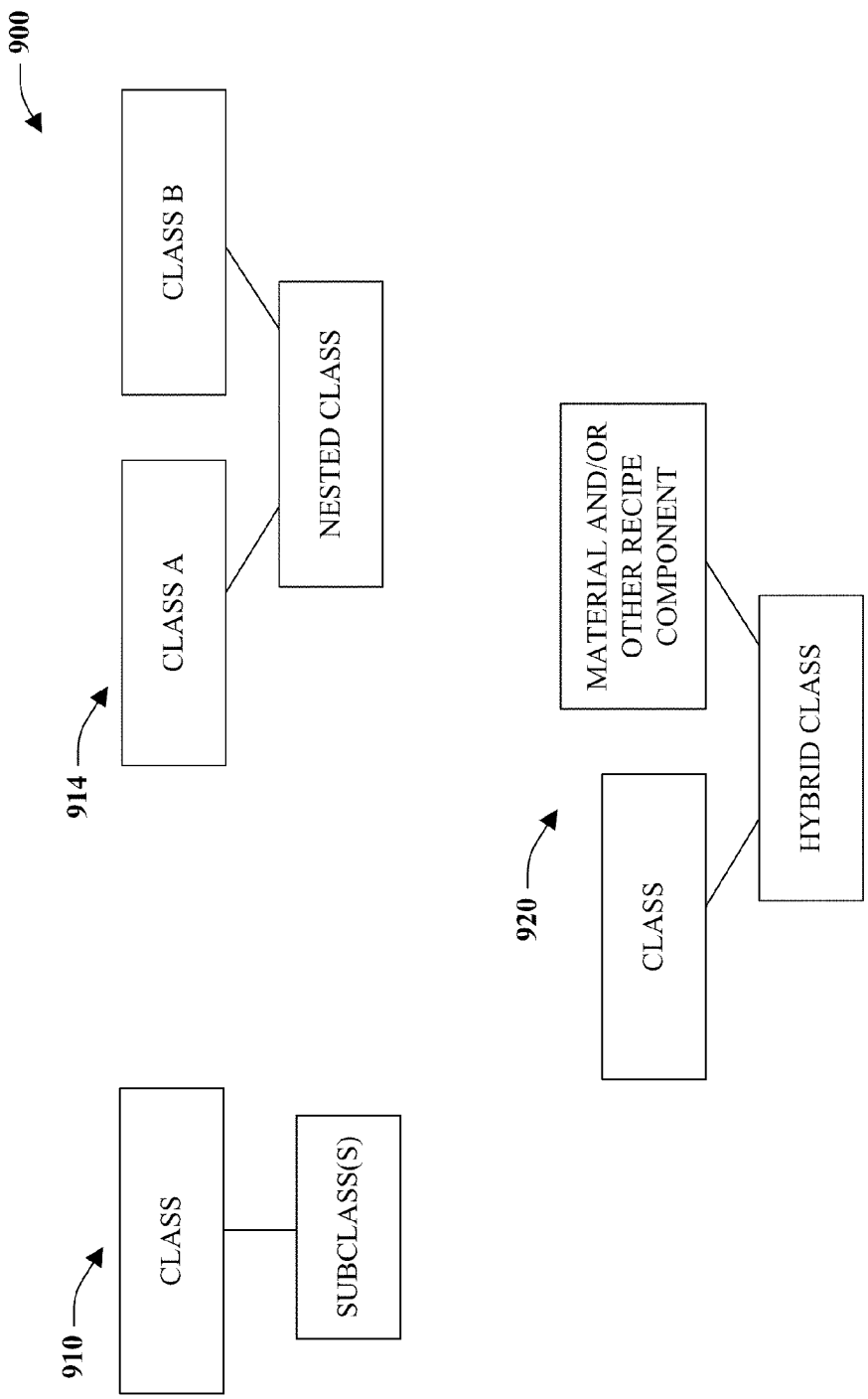
FIG. 9 is a diagram illustrating alternative class structures.

Referring to FIG. 9, a diagram 900 illustrates alternative class structures. The classes described above with respect to FIG. 8, generally describe a structure wherein a class defines similar materials or other components of a recipe. In this aspect, the class structure may define or incorporate other structures or components of a respective class that are then resolved to various components of a recipe. For example, at 910 a class may be defined having one or more subclasses. In one example, a class "Beer" may describe subclasses such as "dark beer," "light beer," "amber beer," and so forth wherein respective subclasses are then resolved for an associated material or other component (e.g., dark beer subclass is resolved from the class beer and then further resolved for the process, equipment, or ingredient to produce dark beer).

At 914, the concept of a nested class may be employed. In this example, a nested class incorporates two or more classes (e.g., Class A and Class B defined for a particular nested class). In yet another example, hybrid classes may be employed at 920. Hybrid classes my be defined to include a class structure having one or more of the components of the hybrid class belonging to a class along with a material and/or other component that are not defined as members of a class. For example, the hybrid class at 920 may include one or more classes and one or more materials that are not associated with a respective class. When a hybrid class is encountered, the respective classes and materials defined within the hybrid class structure can be resolved for the specific materials or components of the recipe from a list depicting the class components along with other members of the hybrid class that do not belong to the other classes. It is to be appreciated that the class structures depicted in FIG. 9 are exemplary in nature. Thus, although not shown, various combinations of class structures can be extrapolated there from. For example, a hybrid class may include classes, subclasses, nested classes, and/or materials or other components not associated with a respective class, subclass, or nested class.

Figure 10:
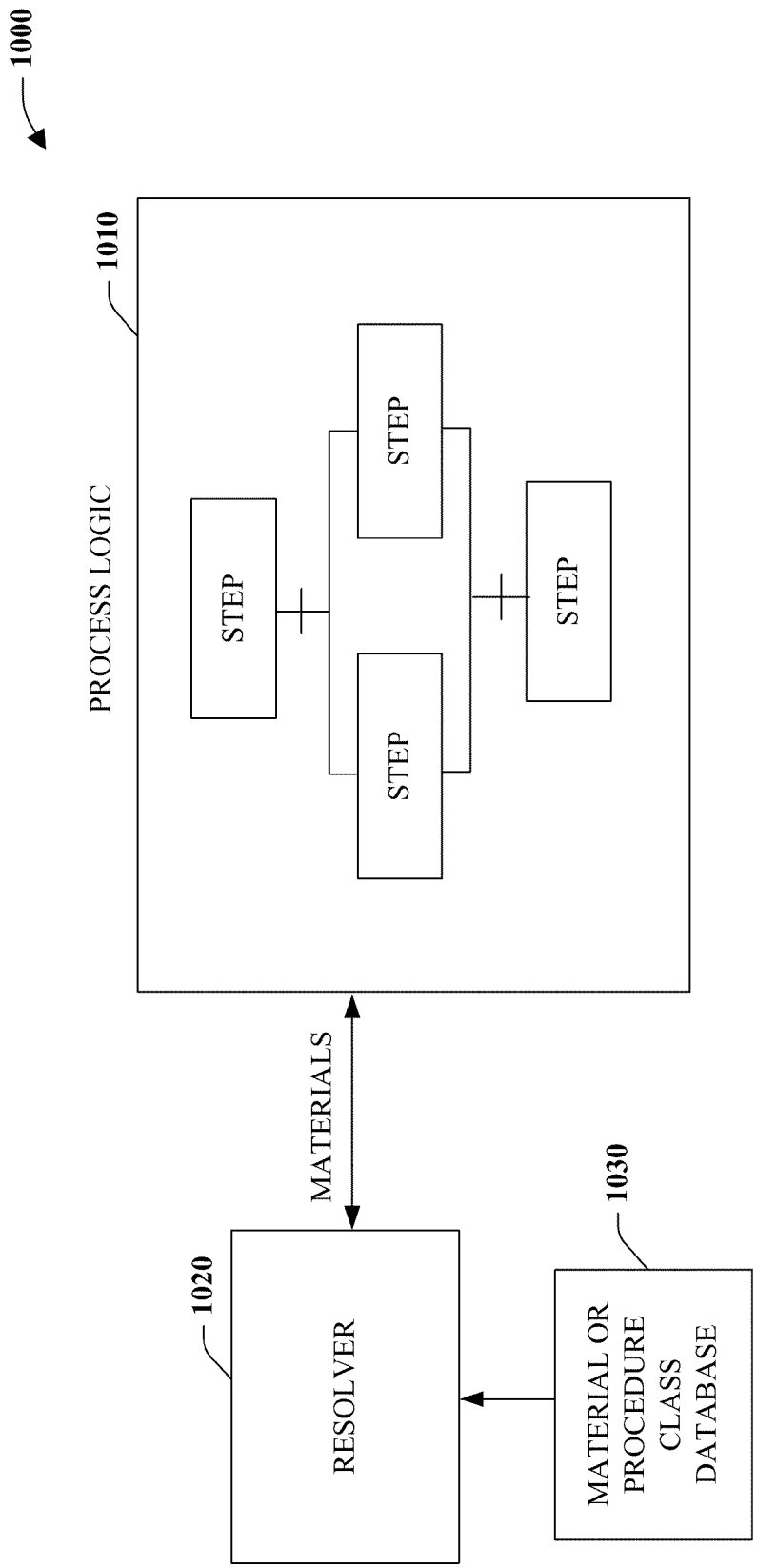
FIG. 10 is a diagram illustrating a material class processing.

Referring now to FIG. 10, a system 1000 illustrates material or procedure class processing. Material classes may be resolved in various situations and processes. In one aspect, at run time of a logic program such as a Sequential Function Chart (SFC) 1010, a material class may be encountered before or during execution of the SFC 1010, wherein during a step or other sequence within the SFC a reference is made to a material class. If such a class is encountered, the SFC (or logic associated therewith) can contact a batch resolver 1020 to identify respective materials or components associated with the encountered class. As will be described in more detail below, the batch resolver 1020 may invoke a user interface (or automated program) that queries an operator to select a component from the encountered class. In this example, the batch resolver 1020 can access a material class database 1030, lookup the class, and present a material or component list of selections to the operator. In another example, the SFC 1010 may be analyzed prior to loading or execution on a controller (not shown). If any material classes are discovered in the SFC 1010, the material classes are resolved by the batch resolver 1020, wherein selected materials or components are then populated within the SFC and downloaded to the controller for execution. Thus, material classes can be embedded within the SFC 1010 and resolved when encountered in the SFC and/or can be resolved prior to execution of the SFC, wherein material class components are resolved, and then associated with the SFC before downloading to a respective controller.

Figure 11:
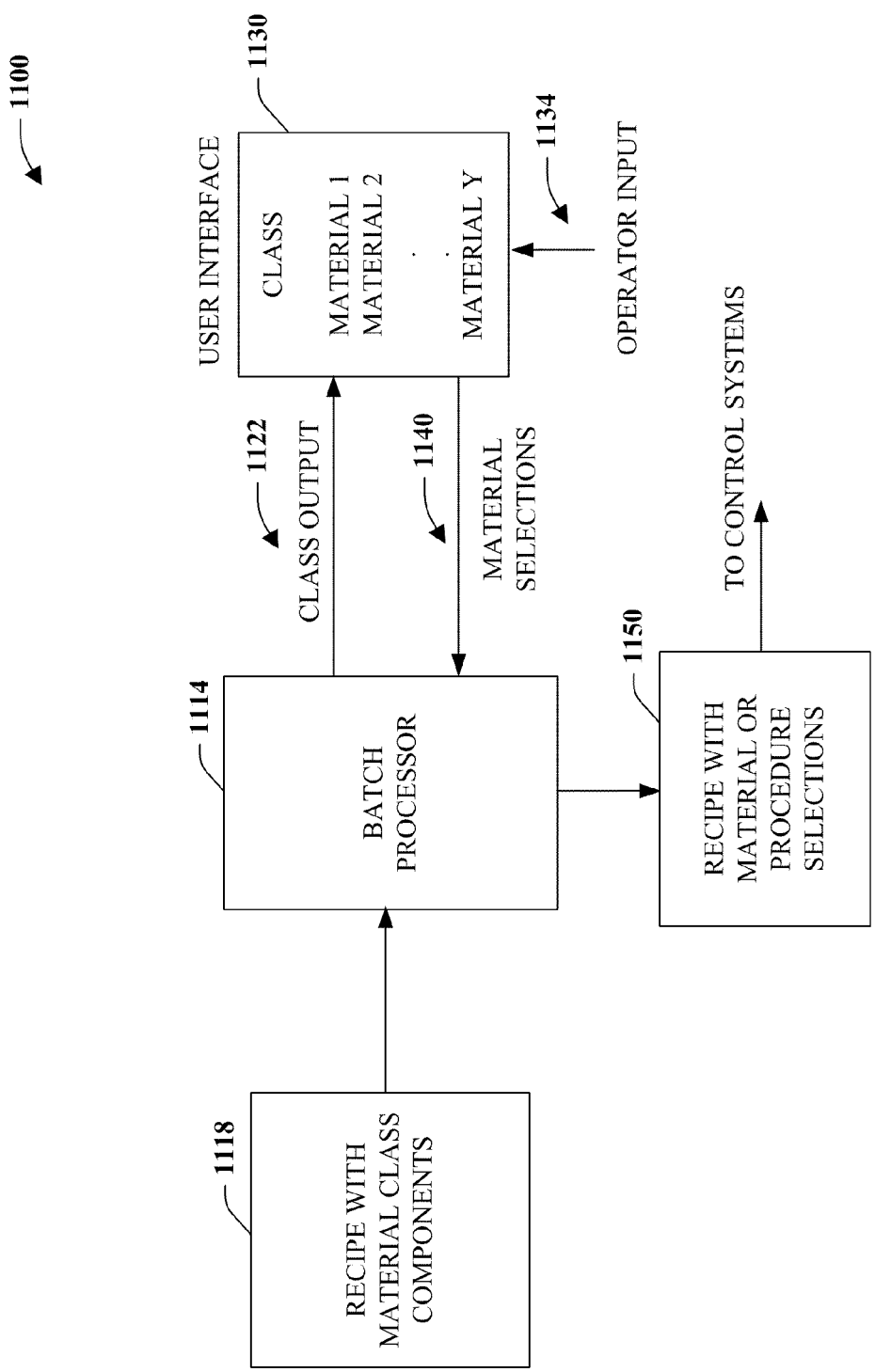
FIG. 11 is a diagram illustrating manual material or procedure selection from a class.

Referring to FIG. 11, a system 1100 illustrates manual material selection from a class. A batch processor 1114 receives a recipe 1118 having one or more material class components. Upon detection of a class within the recipe 1118, the batch processor 1114 transmits a class output 1122 to a user interface 1130, whereby the components of the detected class are displayed. In this example, Materials 1-Y are displayed at the user interface 1130, wherein Y is an integer, and the materials are derived from the detected class. Depending upon the current (or future) recipe the operator desires to run, one or more of the materials are selected at the user interface 1130 via one or more operator inputs 1134 (e.g., mouse, keypad, voice) and provided to the batch processor 1114 as material selections 1140. After receiving the material selections 1140, the batch processor 1114 configures a recipe having the desired material selections at 1150. The recipe 1150 with material selections is then loaded on a control system in order to manufacture the desired recipe.

The user interface 1130 is provided to serve various applications to process classes. For example, the user interface 1130 can include a material editor for manipulating the material classes and an equipment editor for specifying equipment and/or a recipe editor for manipulating the recipe 1118 (or recipes). For example, a material editor provides a user interface 1130 to facilitate creating a material database, which includes materials, classes, lots, sublots, containers, and/or storage location data.

The user interface 1130 includes various data manipulation and output capabilities. To implement material-based recipes, several types of data are typically configured such as:

Material Data

To add materials, lots, sublots, and the containers that hold them. This data is typically stored in a material database;

Equipment Data

An equipment editor can be employed to create material-enabled phases and then associate the resultant equipment module with a container;

Recipe Data

A recipe editor can be utilized to define the materials and amounts to employ in a recipe 1118.

As can be appreciated, the user interface 1130 can include various display and input capabilities. Thus, the user interface can be provided as a Graphical User Interface (GUI) or interface application to interact with the system 1100. This can include substantially any type of application that sends, retrieves, processes, and/or manipulates the various models, data, and processes described herein. For example, such user interfaces 1130 can also be associated with an engine or web browser although other type applications can be utilized. The user interface 1130 includes a display having one or more display objects (not shown) including such aspects as configurable icons, buttons, sliders, input boxes, selection options, menus, tabs and so forth having multiple configurable dimensions, shapes, colors, text, data and sounds to facilitate operations with the systems and processes described herein. In addition, the user interface 1130 can also include a plurality of other inputs 1134 or controls for adjusting and configuring one or more aspects. This can include receiving user commands from a mouse, keyboard, speech input, web site, remote web service and/or other device such as a camera or video input to affect or modify operations of the user interface 1130.

The subject matter as described above includes various exemplary aspects. However, it should be appreciated that it is not possible to describe every conceivable component or methodology for purposes of describing these aspects. One of ordinary skill in the art may recognize that further combinations or permutations may be possible. Various methodologies or architectures may be employed to implement the subject invention, modifications, variations, or equivalents thereof. Accordingly, all such implementations of the aspects described herein are intended to embrace the scope and spirit of subject claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An industrial control system, comprising:
 a memory configured to store computer-executable components; and a processor, communicatively coupled to the memory, configured to execute or facilitate execution of the computer-executable components, the computer-executable components comprising:
  a graphical interface component configured to populate, based on information received from a data store, a field with a valid parameter range associated with an equipment employable to execute at least a portion of an industrial control process for producing a product batch, wherein the graphical interface component is further configured to receive, via a user interface, input data that selects a parameter value associated with a capability of the equipment from the valid parameter range, and wherein the parameter value is associated with capability data indicative of an input capability and an output capability of the equipment with respect to the industrial control process; and
  a processing component configured to:
    determine a procedure class structure comprising an abstraction of a procedure for executing the industrial control process,
    create a recipe from the abstraction of the procedure comprising controller program code customized according to the capability of the equipment,
    customize the controller program code based on yield data that is received via the user interface and is indicative of a yield percentage associated with the industrial control process, and a condition associated with the equipment, and
    install the controller program code on at least one industrial automation controller tasked to execute the industrial control process.

2. The industrial control system of claim 1, wherein the processing component is further configured to customize the controller program code in response to a determination that the equipment satisfies an availability criterion associated with the industrial control process.

3. The industrial control system of claim 1, wherein the processing component is further configured to select, based on the parameter value, the procedure class structure with the industrial control process, wherein an operational template facilitates the implementation of the instance.

4. The industrial control system of claim 1, wherein the processing component is further configured to customize the controller program code based on tag data indicative of a tag value associated with a controller device of the industrial control system.

5. The industrial control system of claim 1, wherein the processing component is further configured to customize controller program code based on throughput information indicative of a specified throughput option associated with an inventory model.

6. The industrial control system of claim 4, wherein the tag data specifies a classification of the equipment.

7. The industrial control system of claim 1, wherein the processing component is further configured to customize the controller program code based on throughput information indicative of a specified throughput option associated with a business process model.

8. The industrial control system of claim 1, wherein the processing component is further configured to customize the controller program code based on counter information indicative of a counter value associated with the industrial control process.

9. The industrial control system of claim 1, wherein the processing component monitors equipment data associated with the equipment to determine the parameter value.

10. The industrial control system of claim 9, wherein the input capability comprises at least one of a number of input feeds that drive a process or a number of holding areas for the process.

11. The industrial control system of claim 9, wherein the output capability comprises at least one of a pump control, a valve control, a conveyor control, a temperature control, or a mixer control capability of the equipment.

12. The industrial control system of claim 1, wherein the installing comprises transmitting the controller program code to the at least one industrial automation controller.

13. The industrial control system of claim 1, further comprising:
  a batch server that resolves a material class associated with the industrial control process to facilitate the implementation of the controller program code.

14. The industrial control system of claim 1, wherein the procedure class structure is associated with an S88 class.

15. A method of controlling equipment in an industrial control process, comprising:
  determining, by a system comprising a processor, a procedure class comprising an abstraction of a procedure for a batch process;
  based on information received from a data store, populating a field displayed via a human machine interface with a valid parameter range associated with an equipment employable to implement at least a portion of the batch process;
  receiving, via the human machine interface, input data that selects a parameter value associated with performance of the equipment from the valid parameter range, the parameter value being indicative of an input capability and an output capability of the equipment with respect to the batch process;
  receiving via the human machine interface yield data indicative of a yield percentage associated with the batch process;
  creating a recipe from the abstraction of the procedure comprising controller program code customized according to the capability of the equipment, the yield data, and a condition associated with the equipment; and
  installing the controller program code on at least one industrial automation controller assigned to execute the batch process.

16. The method of claim 15, wherein the controller program code is further customized based on throughput data indicative of a defined throughput option.

17. The method of claim 15, further comprising, employing the procedure class in conjunction with a material class.

18. The method of claim 17, wherein the employing comprises utilizing at least one of a nested class or a hybrid class.

19. A non-transitory computer readable medium comprising computer-executable instructions that, in response to execution, cause an industrial control system comprising a processor, to perform operations, comprising:
  determining a procedure class structure-comprising an abstraction of a procedure for a batch process;
  presenting, via a display interface, a field populated with a valid parameter range associated with an equipment employable to execute at least a portion of a batch process, wherein the valid parameter range is determined based on information received from a data store;
  receiving, via the display interface, input data that selects a parameter value associated with a capability of the equipment from the valid parameter range, the parameter value being indicative of an input capability and an output capability of the equipment with respect to the batch process; and receiving via the display interface yield data indicative of a yield percentage associated with the batch process;

creating a recipe from the abstraction of the procedure comprising controller program code customized according to the capability of the equipment, the yield data, and a condition associated with the equipment; and installing the controller program code on at least one industrial automation controller assigned to execute the batch process.

20. The non-transitory computer readable storage medium of claim 19, wherein the controller program code is further customized based on throughput data indicative of a defined throughput option associated with the batch process.

* * * * *